July 13, 1926.

W. GANZ 1,592,630

LOCK FOR STEERING GEARS

Filed Sept. 22, 1922

Inventor:
William Ganz
By: Wm. O. Belt
Atty.

Patented July 13, 1926.

1,592,630

UNITED STATES PATENT OFFICE.

WILLIAM GANZ, OF CHICAGO, ILLINOIS, ASSIGNOR TO BAUER LOCK COMPANY, A CORPORATION OF DELAWARE.

LOCK FOR STEERING GEARS.

Application filed September 22, 1922. Serial No. 589,737.

This invention relates to locks for steering gears of the type that permits the wheel to be locked to the steering shaft for directing the movement of the vehicle or to be released therefrom when it is desired to put the vehicle out of commission, and has for its principal object to simplify the construction and improve the operation of these devices.

A further object of the invention is to provide the wheel with a rotary bolt directly operated by a lock and directly engaging with means on the steering shaft to effect the driving action.

Further objects of the invention will become apparent as the description is read in connection with the accompanying drawing illustrating a selected embodiment of the invention, and in which—

Figure 1:
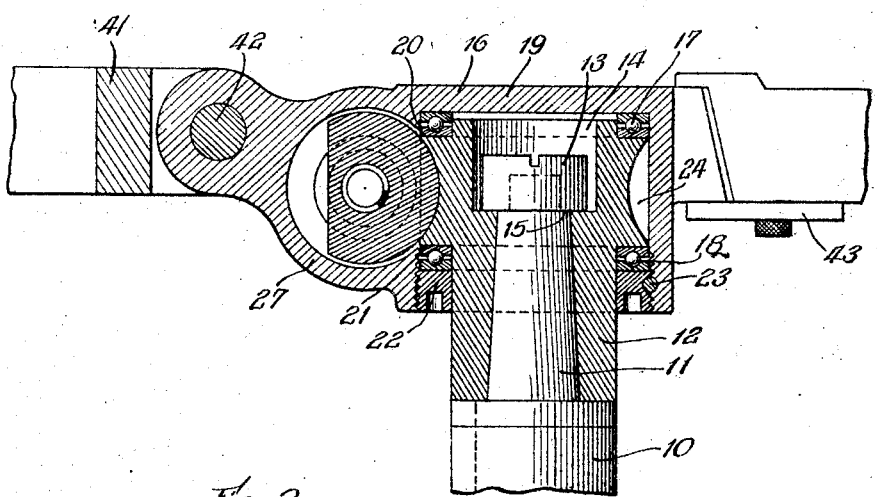
Figure 2:
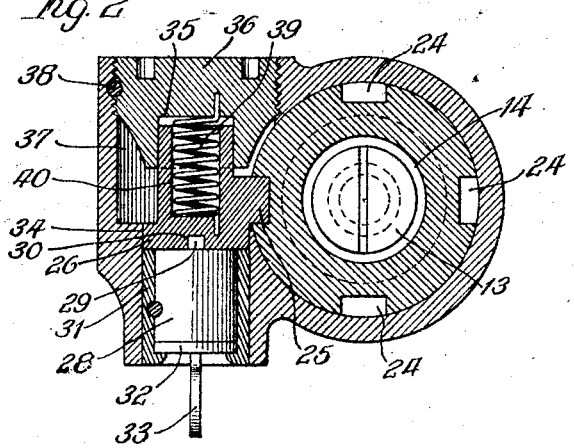

Fig. 1 is a vertical section through a portion of the steering wheel and steering shaft in which the invention is embodied, and Fig. 2 is a section through the structure shown in Fig. 1 and taken on a plane at right angles to Fig. 1.

In the drawing 10 indicates a steering shaft which is preferably reduced and tapered as indicated at 11 to receive the head 12 which is secured thereon by a nut 13 seating against the bottom of a socket 14 in the hub and a shoulder 15 on the shaft. The hub 16 of the steering wheel is journaled on the head 12 and preferably there are roller bearings such as illustrated at 17 and 18 to reduce the friction to a minimum. The bearings 17 are interposed between the closed upper end 19 of the hub and the shoulder 20 adjacent to the upper end of the head and the bearings 18 are interposed between a shoulder 21 on the lower side of the head and a screw collar 22 which threads into the base of the hub and secures it in place on the head. Preferably this screw collar is locked to the hub by a pin 23 extending tangentially to the collar and through the hub.

The head 12 is provided with a plurality of arcuate notches or seats 24 in its periphery to receive a rib or arm 25 carried by a rotary bolt 26 journaled in the boss 27 of the hub 16. This boss also receives a cylinder lock 28 which has a plug carrying a rib or key 29 fitting in a slot 30 in the bolt and providing a strong driving action between the lock and the bolt. The lock is preferably protected by a hardened steel jacket 31 and a face disc 32 through which latter a slot extends to permit the key 33 to be entered.

One end of the bolt 26 is journaled in the chamber 34 which receives the lock, and the other end is journaled in a socket 35 in a plug 36 which is threaded into an enlarged bore 37 of the boss. The plug 36 is locked to the hub by a tangent pin 38 similar to the pin 23.

The rib or arm 25 is here shown substantially circular with a segment at one side removed. When this cut-away portion is turned towards the head 12 the wheel is free to rotate relative to the shaft and a vehicle cannot be steered. When, however, the bolt is rotated to bring the rib 25 into one of the seats 24, the wheel is rigidly locked to the shaft, and the vehicle may be steered in the usual manner.

Preferably the bolt 26 is normally held in position to lock the wheel to the shaft by a helical spring 39 arranged in a chamber 40 within the bolt and having its opposite ends secured to the bolt and a plug 36 respectively.

As shown, the body of the wheel 41 is hinged to the hub by a pintle 42 and a latch 43 may either permit the wheel to be tilted or hold it in operative position, as may be desired.

By journaling the wheel hub on the head 12 substantially in the manner set forth the steering wheel is always held in proper alinement and prevented from wabbling whether it is locked to the shaft or freed therefrom. This is a very decided improvement over prior constructions.

A simple rotary movement of the bolt 26 serves to either lock the wheel to the shaft or free it therefrom and the action is direct and positive. By connecting the bolt to the lock through the means of the key and groove a very powerful engagement is effected which is practically free from wear in use. The simple movement of the bolt renders it practically free from any tendency to bind or jam and acting directly on the head there is no lost motion due to unavoidable looseness of parts.

The improved construction embodies a minimum of parts and an extremely simple arrangement that makes it cheap and easy to manufacture and very reliable in service.

I am aware that changes may be made in the form, construction and arrangement of the invention, as set forth in the selected embodiment herein, without departing from the scope or sacrificing any of its material advantages, and I therefore reserve the right to make all such changes as fairly fall within the scope of the following claims.

I claim:

1. In a steering gear, the combination of a steering shaft, a steering wheel having a chamber therein, a hollow bolt journaled in said chamber to rotate about an axis transverse to said shaft, a lock journaled in said chamber adapted to rotate said bolt, and a helical spring within the hollow bolt and having one end connected to the chamber and its opposite end connected to the bolt for holding said bolt in operative position.

2. In a steering gear, the combination of a steering shaft, a steering wheel having a hub rotatably embracing the shaft and provided with a chamber portion at one side of the shaft, a lock mounted within one end of the chamber portion, a plug closing the opposite end of the chamber portion and permanently secured in place, a rotatable bolt connected at one end to the lock and having its opposite end journalled in a socket in the plug, there being a projection and socket locking engagement between the bolt and the shaft, and a helical spring mounted within the bolt and having one end connected therewith and its opposite end projecting from the bolt and engaged with the plug to normally and yieldably maintain the bolt in engagement with the shaft.

WILLIAM GANZ.